United States Patent Office 3,329,082
Patented July 4, 1967

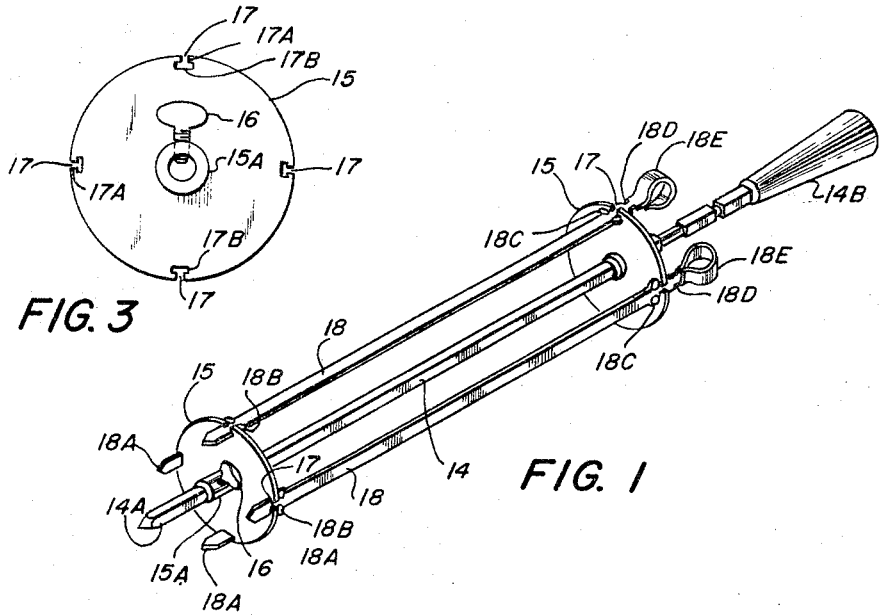
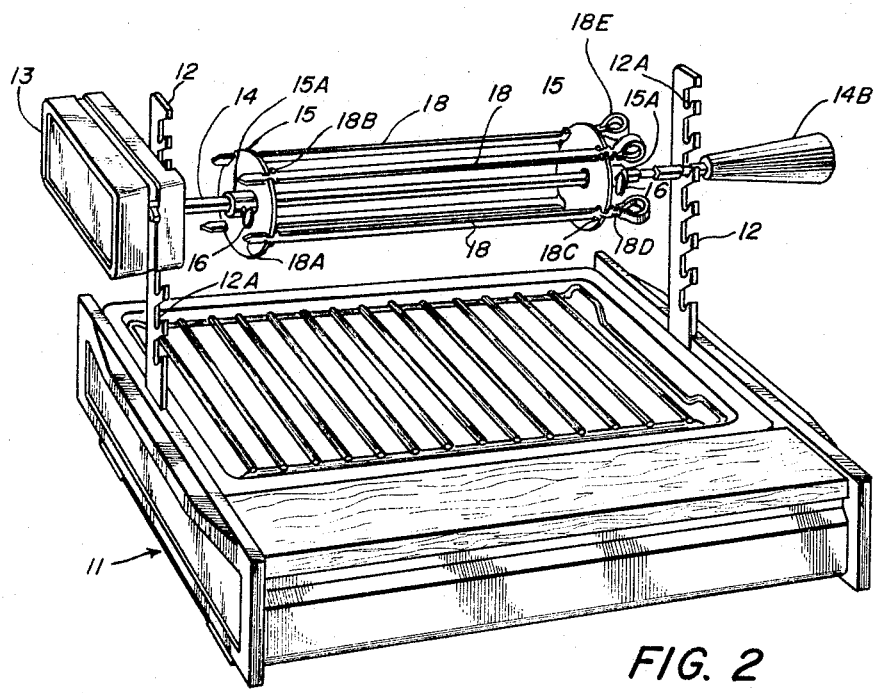
INVENTOR.
BRUNO SATKUNAS

3,329,082
SHISH KABAB COOKING FIXTURE
Bruno Satkunas, Lexington, Ohio, assignor to Dominion Electric Corporation, a corporation of Ohio
Filed Mar. 29, 1965, Ser. No. 443,521
8 Claims. (Cl. 99—421)

My invention relates to cooking fixtures of the type used for cooking shish kababs and the like.

An object of my invention is to provide improved apparatus for mounting and demounting shish kababs spits in position for the cooking operation.

Another object is the provision of an improved fixture adapted for ready and convenient holding of the spits upon which shish kabab food is carried.

Another object is the provision of a unique combination of spits, spit holders and a shaft carrying the spit holders.

Another object is the provision for making it easy and convenient to handle the spits of a shish kabab fixture in both assemblying and disassembling the spits with the fixture.

Other objects and a fuller understanding of the invention may be had by referring to the following description and claims, taken in conjunction with the accompanying drawing, in which:

FIGURE 1 is a perspective view of my improved shish kabab cooking fixture removed from its support;

FIGURE 2 is a perspective view of a cooking device carrying supports upon which my improved shish kabab fixture is mounted;

FIGURE 3 is an enlarged end view of one of the spit holders utilized in my fixture; and FIGURE 4 is an enlarged view of one of the spits used in my cooking fixture.

A cooking unit is denoted generally by the reference character 11. This cooking unit may embody an electric heating element for providing heat for the cooking operation or it may hold charcoal or other like fuel for providing cooking heat. Carried at the opposite ends of the unit 11 are two upright members 12, each having a plurality of vertically spaced notches 12A formed therein. A shaft 14 is adapted to be placed in aligned notches 12A of the two supports 12 at a desired elevation above the cooking unit 11. As is apparent, the shaft 14 may be disposed in a generally horizontal plane at the desired elevation. Non-rotatively carried by one of the upright members 12 is an electric motor-driving unit 13. The connection between the unit 13 and the upright member 12 is such that the unit 13 may be raised to any desired elevation along the height of the support 12. The unit 13 has a socket (not shown) into which the square end 14A of the shaft 14 may mounted so that rotation of the motor in the unit 13 rotates the shaft 14. At the other end of the shaft 14 a heat-insulated handle 14B is provided.

Mounted upon the shaft 14 are two similar flat disks or spit holders 15. Each of these disks 15 has a hub portion 15A through which the shaft 14 extends. There are two thumb screws 16 each threadably engaged to a hub 15A, the end of the thumb screw 16 extending inwardly of the bore of the hub 15A to engage a flat side of the square shaft 14. Thus, the thumb screws 16 prevent rotation of the disks 13 relative to the shaft 14 and also secure the disks 15 at desired locations along the length of the shaft 14. By loosening the thumb screws 16, the disks 15 may be slid longitudinally along the shaft 14 until positioned at desired locations therealong. Upon tightening the thumb screws 16, the disks 15 are secured at fixed locations along the length of the shaft 14.

Each of the disks 15 is provided with a plurality of slots 17 extending radially inward from the outer peripheral circumference thereof. In the embodiment illustrated, each disk 15 has four slots 17 equidistantly spaced around the periphery thereof. Each slot 17 has a relatively narrow throat portion 17A next adjacent the outer periphery of the disk 15 and has inwardly thereof a bay or enlarged inner portion 17B. The bays 17B may also be referred to as openings extending through a disk 15. As is seen, the arrangement of the throat portions 17A and bay portions 17B is such that there are two opposite shoulders extending along a side of the opening in the disk provided by the bay portion 17B.

There are four spits 18 each made of a long flat thin strip of metal, preferably stainless steel. Each spit 18 has a pointed end 18A formed for the ready spearing of articles of food on the spit in the usual manner. Near the pointed end 18A there are two enlargements or projections 18B formed on the opposite sides of the spit 18. These enlargements 18B are preferably formed by flattening or swedging the metal at this location to cause the metal to flow outwardly in the plane of the flat spit 18. At a location spaced from the enlargements 18B and closest to the handle 18E formed by looping the other end of the spit 18 are another pair of enlargements or projections 18C similarly formed on the spit 18. Between the enlargements 18C and the handle 18E there is a narrow or relatively small portion 18D provided by notching opposite sides of the spit 18 at that location.

In assembling the spits to the fixture, the disks 15 are first placed upon the shaft 14 at the appropriate locations illustrated in FIGURES 1 and 2. The disk 15 closest to the pointed end 14A is secured in position by the tightening of the thumb screw 16 carried by that disk 15. Spits 18 upon which food has been speared in the usual manner are then mounted one at a time on the two spaced disks 15. At this point, the right-hand end disk 15 closest to the shaft handle 14B may be moved along the shaft 14 by reason of the looseness of the thumb screw 16 on that right-hand disk. A spit 18 having food speared thereon is positioned generally parallel to the shaft 14 and the pointed end 18A thereof is inserted in a longitudinal direction through the opening or bay 17B of the disk 15 closest to the pointed end 14A of the shaft. The dimension of the bay portion or opening 17B is such that it complementarily receives in a sliding fit the spit 18. The cross-sectional area of the spit 18, except at the locations of the enlargements 18B and 18C and the narrow portion 18D, is substantially uniformly rectangular and of a size and dimension as to complement the bay portion or opening 17B. The spit 18 is then moved longitudinally relative to the left-hand disk 15 so as to abut the enlargements 18B against the side of the left-hand disk 15 substantially to the location illustrated in FIGURES 1 and 2.

The right-hand disk 15, that is, the one closest to the handle 14B of the shaft 14, while slidable along the shaft 14, is moved so that the right-hand disk 15 is in alignment with the narrow portion 18D of the respective spit 18. The width of the narrow portion 18D is such that the narrow portion 18D may be moved radially through the throat portion 17A of the slot 17 so as to locate the spit 18 radially inward and into the bay portion 17B. That particular spit 18 is then held in that position while the other three spits 18 are consecutively mounted in a similar manner to the two spit holders or disks 15. As seen in the drawing, the disks 15 are positioned so that slots 17 of the respective disks are in alignment so that each spit 18 may be positioned parallel with the shaft 14 and with the other spits 18. After all of the spits are positioned within the aligned openings or bay portions 17B, then the right-hand disk 15, that is, the one closest to the handle 14B, is slid along the shaft 14 toward the other disk 15 and thus to move the right-hand disk 15 from out of alignment with the narrow portions 18D of the respective spits 18 to a location where the right-hand disk 15 abuts the enlargements 18C of the respective spits 18, that is, to the position illustrated in FIGURES 1 and 2. When in this position, then the thumb screw 16 carried by the right-hand disk 15 is tightened so as to secure the right-hand disk 15 in position whereby the two disks 15 are at a fixed location relative to each other. It is to be noted that the shoulders provided by the narrow throat 17A prevent the spits 18 from being moved radially outward from the shaft 14 and hence lock the spits 18 to the disks 15.

When it is desired to remove the spits 18 from the disks 15, the right-hand disk 15 is loosened and slid toward the handle 14B to a location where the narrow portions 18D of the spits 18 are in alignment with the slots 17. By reason of the dimension of the narrow portion 18D, relative to the width of the throat 17A, the narrow portion 18D may be moved radially outward and thus clear the spit 18 from the right-hand disk 15. Each spit is similarly released from the right-hand disk 15. After being cleared from the right-hand disk 15, the spits 18 may be moved longitudinally so as to pull the pointed ends 18A through the openings 17B toward the right and hence out of the left-hand disk 15 so as to be released therefrom. Each spit 18 may then be separately handled and the food removed therefrom.

It is seen that shish kabab food may be readily mounted on the spits, the spits readily secured to the two disks 15, and the disks 15 readily held to the shaft 14. Upon rotation of the shaft 14, the spits 18 revolve around the axis of the shaft 14 so as to cook food on the spits 18 by means of the heat produced in the cooking unit 11 below.

The present disclosure includes that contained in the appended claims, as well as that of the foregoing description.

Although this invention has been described in its preferred form with a certain degree of particularity, it is understood that the present disclosure of the preferred form has been made only by way of example, and that numerous changes in the details of construction and the combination and arrangement of parts may be resorted to without departing from the spirit and scope of the invention as hereinafter claimed.

What is claimed is:

1. A shish kabab cooking fixture comprising the combination of a rotatable shaft having a non-circular cross-section, a pair of disk members each having an opening therethrough for receiving said shaft therethrough and being non-rotatably engageable therewith for causing rotation of said disks therewith, a first of said disks having a plurality of openings therethrough at intervals therearound, a second of said disks having a plurality of slots extending radially inward from the circumference thereof at intervals corresponding generally to the intervals of the openings in said first disk, said slots each having a narrow throat adjacent the circumference and a relatively enlarged portion radially inward of the cirumference, locking means associated with each of said disks for adjustably locking each of said disks to said shaft in a selected position along the said shaft spaced longitudinally from the other selected position, a plurality of spits each adapted to carry food speared by the spit for the cooking thereof, said spits being adapted to be arranged radially spaced from, and generally parallel to, the axis of said shaft at intervals therearound, each spit having a forward end portion insertable into a respective opening of said first disk in an axial direction from a side of the said first disk and retainable therein against radially directed displacement by the edge of the said respective opening, each spit having a rearward end portion, said rearward end portion having first and second portions spaced along said rearward end portion, said first portion having a cross-sectional dimension permitting the first portion to be moved radially inward through the throat of a respective slot and into the enlarged portion thereof, said second portion having a cross-sectional dimension preventing radially outward withdrawal from said enlarged portion thereof through said throat, each said spit being lockable in a slot by moving the said first portion thereof radially inwardly into a slot when the second disk is in the same plane as said first portion and by then moving the second disk and first portion relative to each other into different planes normal to the spit, the arrangement of shaft, disks, locking means and spits being such that the first disk may be locked in position on the shaft by said locking means, the forward end portion of a said spit may be inserted into the said openings of the first disk and there held against radially outward directed displacement, the first portion of the rearward end portion may be moved radially inward of a said slot through the throat thereof and the second disk moved along the shaft and locked in position on the shaft by the locking means to locate the second portion of the said spit's rearward end portion in the enlarged portion of the said slot and there held against radially outward directed displacement through said throat of the slot.

2. A fixture as claimed in claim 1 and in which said openings in the first disk are equidistantly spaced around said first disk and said slots in the second disk are equidistantly spaced around said second disk in correspondence with the spacing of the openings in the first disk, the radial distances of the openings and slots from the axes of the respective disks being such that spits in aligned openings and slots of the disks are disposed substantially parallel to the common axis of the disks.

3. A shish kabab cooking fixture comprising a rotatable shaft, a first disk carried by and rotatable with the shaft at a first location along the length of the shaft, a second disk carried by and rotatable with the shaft at a second location along the length of the shaft spaced from said first location, a plurality of spits each adapted to carry food for the cooking thereof, each said spit having a first portion and a second portion spaced apart longitudinally of the spit, each said spit having a handle portion at one end adjacent the second portion and a free end at its opposite end adjacent the first portion, said second portion having a relatively narrow part and a relatively wide part adjacent each other longitudinally of the spit, said relatively wide part being positioned on the side of the relatively narrow part which is closest to said first portion of the spit, the said first disk having a plurality of sockets uniformly distributed around the axis thereof, each socket being adapted to receive and to hold against radial displacement a first portion of a spit upon the insertion of the free end thereof in an axial direction to locate the said first portion in the socket, the said second disk having a plurality of slots uniformly distributed around the axis thereof and extending radially inward from the circumferential edge thereof, each said slot having a relatively narrow throat adjacent the said circumferential edge and a relatively wide bay disposed radially inward of said throat, said throat being wide enough to permit the said narrow part of the spit to move radially therethrough but not wide enough to permit the said wide part of the spit to move radially therethrough, said bay being sufficiently large to accommodate said wide part therein, said second disk being selectively movable along said shaft relative to spits having their first portions located in said sockets of the first disk to position said slots of the second disk adjacent said narrow part of the respective spits to permit radial movement of said narrow parts through said throats and thence toward said first disk to position said slots of the second disk adjacent said wide part of the respective spits to bar radial movement of said wide parts through said throats.

4. A fixture as claimed in claim 3 and including locking means associated with said shaft and second disk for selectively locking said second disk to the shaft for maintaining the slots thereof adjacent said wide part of the respective spits and retaining the same in said bays against radial movement outwardly through said throats.

5. A fixture as claimed in claim 4 and including limit means carried by each said spit for limiting movement of the spit into the said sockets upon insertion of the free ends thereof into said sockets.

6. In a revolvable spit structure for the cooking of food on spits, comprising the combination of a rotatable shaft, a first and a second spit holder carried by the shaft at spaced locations therealong and engaged thereto to rotate with the shaft, a plurality of spits adapted to carry food speared thereon, each said spit having a pointed end at the first end for spearing food and a handle at the opposite end for handling the spit, said first holder having a plurality of first spit-engaging portions distributed therearound radially outward from the axis thereof, each said first spit-engaging portions being formed to receive a said spit and to hold the same against radial movement upon said spit being inserted in an axial direction from a side of the first holder into a said spit-engaging portion, said second holder having a plurality of second spit-engaging portions distributed therearound, each said second spit-engaging portion having a space complementarily receiving a spit extending therethrough in an axial direction, each said second spit-engaging portion having a restricted throat extending radially outward from said space, the side edges of said throat resisting radially outward movement of the spit from said space, said spits having adjoined portions along the length thereof, one of said portions having a cross-sectional dimension permitting it to move radially through a said throat of said second holder and the other of said portions having a cross-sectional dimension preventing its radial movement through a said throat of said second holder to maintain the spit in the spit-engaging portion thereof, said other of said portions being located on the side of said one portion which is closest to said first end of the spit, said spit having an enlarged portion on the side of said other portion which is closest to said first end of the spit, said enlarged portion being of a size to resist axial movement of the spit through said second spit-engaging portion of the second holder, the movement of the spit and second holder in a generally axial path relative to each other in a direction away from said enlarged portion permitting the locations of said first and second portions of the spit to be shifted relative to said throat.

7. A revolvable spit structure comprising the combination of a stand, a horizontally disposed shaft rotatably carried by the stand, a plurality of spits adapted to be arranged substantially equidistantly around said shaft substantially parallel to the axis thereof, a pair of spit holders non-rotatively mounted on said shaft to rotate therewith and to revolve said spits around the axis of said shaft, said spit holders being slidable along said shaft to selected locations therealong, locking means carried by said spit holders for locking the spit holders to the shaft at said desired locations, each said spit having a pointed end and a handle end, a first of said spit holders having openings therethrough equidistantly spaced apart around the axis thereof and spaced from said axis, said openings being adapted to receive and hold the respective spits upon the pointed ends thereof being inserted through the openings from a side of the said first holder, a second of said holders having slots formed in the periphery thereof equidistantly spaced apart around the axis thereof and spaced from said axis, each of said slots having a relatively narrow throat portion adjacent the periphery of the said second holder and a relatively wide inner bay portion radially inward of said throat portion, each of said spits having a relatively slim portion dimensioned to permit it to be moved radially inward and outward through a said throat portion of a slot to and from location in the bay portion of the respective slot, each of said spits having a relatively thick portion dimensioned to be located in said bay portion of a slot but thicker than the width of said throat portion to be barred thereby from being moved radially inward and outward through said throat portion, said thick portion being located on the side of the slim portion closest to the pointed end of the spit, said second spit holder upon being moved along said shaft to one location therealong aligning the said throats of the slots with the relatively slim portions of the spits disposed along said shaft and upon being moved in a direction toward said pointed ends of the spits along said shaft to another location therealong aligning the said throats of the slots with the relatively thick portions of the spits disposed along said shaft, each said spit having a stop portion on the side of said thick portion toward said pointed end to limit the movement of the spit toward said first spit holder.

8. A revolvable spit structure as claimed in claim 7 and in which said spits are relatively flat metal strips the major portion along the length thereof having parallel edges, in which said openings in the first spit holder each have a rectangular cross-section complementing the cross-section of said major portion of the respective spit to non-rotatively receive the same, in which the bay portion of the slots in the second spit holder each have a rectangular cross-section complementing the cross-section of said major portion of the respective spit to non-rotatively receive the same, and in which the spit at a location in alignment with the said major portion is reduced in width to form said relatively slim portion complementing the width of a said throat portion of a slot through which the slim portion may be radially moved.

References Cited

UNITED STATES PATENTS

| 2,762,293 | 9/1956 | Boyajian | 99—421 |
| 2,985,096 | 5/1961 | Wolske | 99—421 |
| 3,104,605 | 9/1963 | McKinney | 99—421 |
| 3,126,814 | 3/1964 | Brown | 99—421 |
| 3,196,776 | 7/1965 | Norton | 99—421 |
| 3,205,812 | 9/1965 | Booth | 99—421 |

FOREIGN PATENTS

| 235,906 | 10/1961 | Australia. |
| 1,093,890 | 11/1954 | France. |
| 487,467 | 12/1929 | Germany. |

WALTER A. SCHEEL, *Primary Examiner.*

J. NEARY, *Assistant Examiner.*